Figure 1:
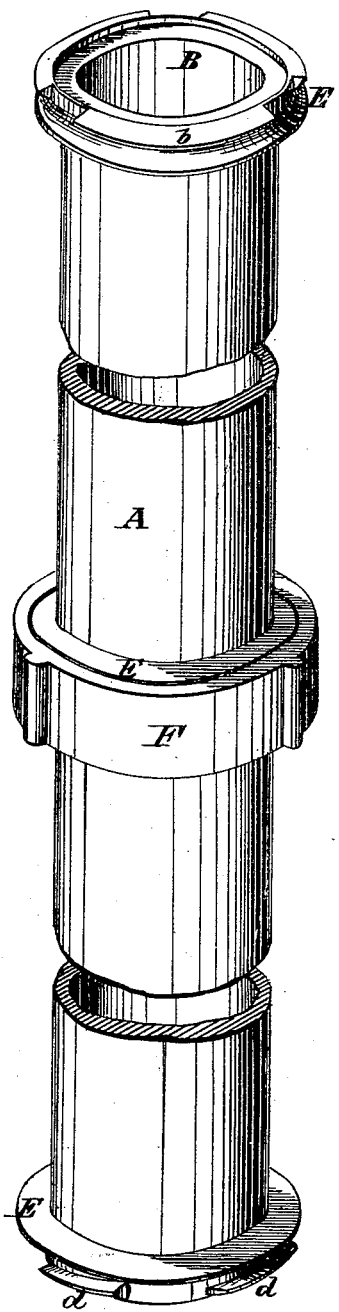

5 Sheets—Sheet 1.

A. O'NEILL.
PIPE JOINTS.

No. 179,815.   Patented July 11, 1876.

WITNESSES
Chas. J. Gooch
Walter Allen

INVENTOR
Andrew O'Neill
By Knight Bros. Attorneys

A. O'NEILL.
PIPE JOINTS.
No. 179,815. Patented July 11, 1876.
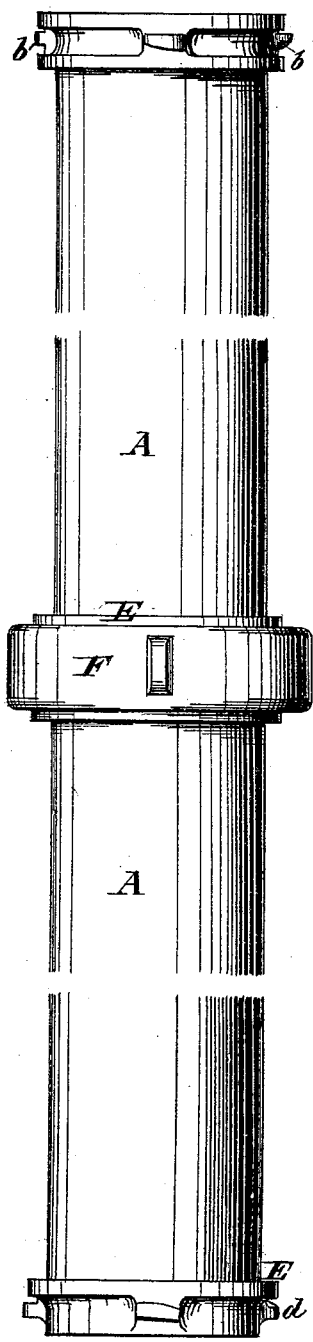
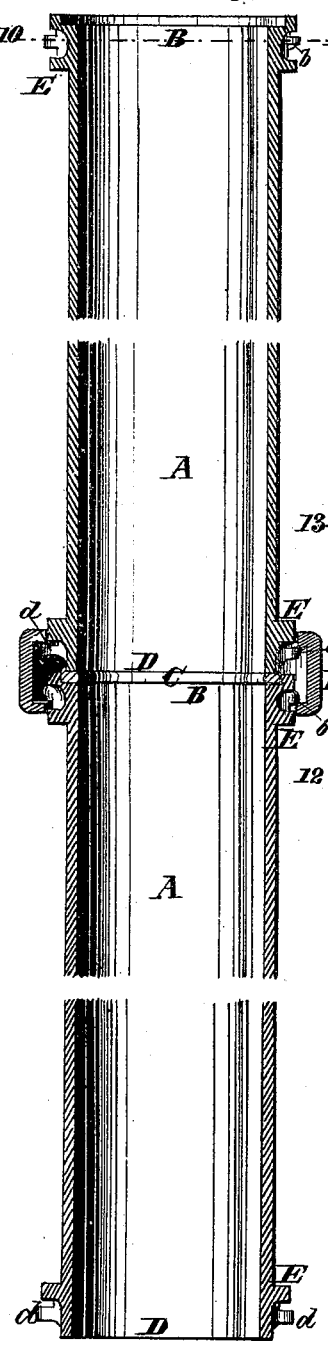
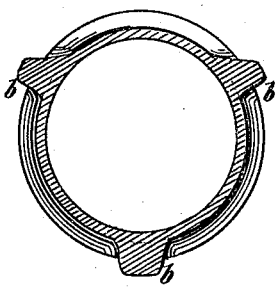
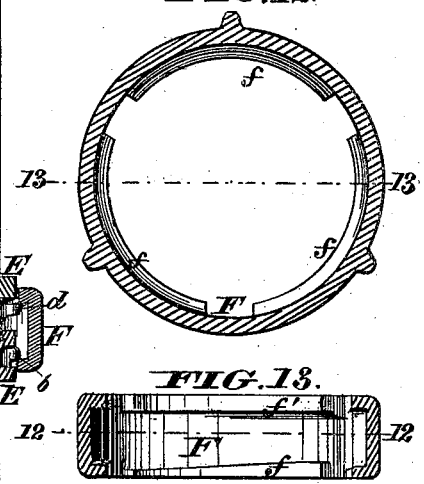
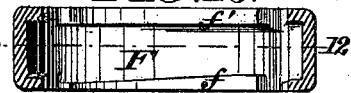
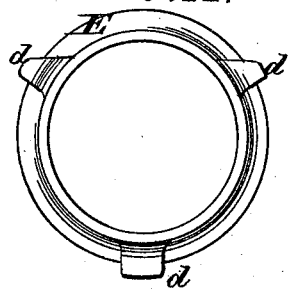
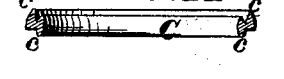

A. O'NEILL.
PIPE JOINTS.
No. 179,815.                Patented July 11, 1876.
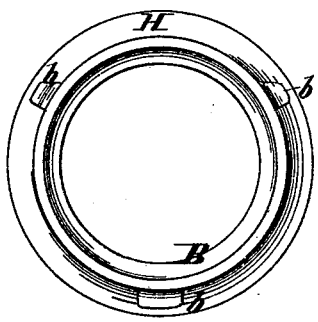
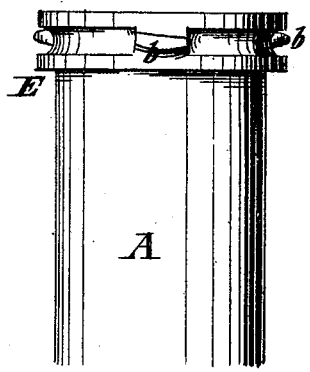
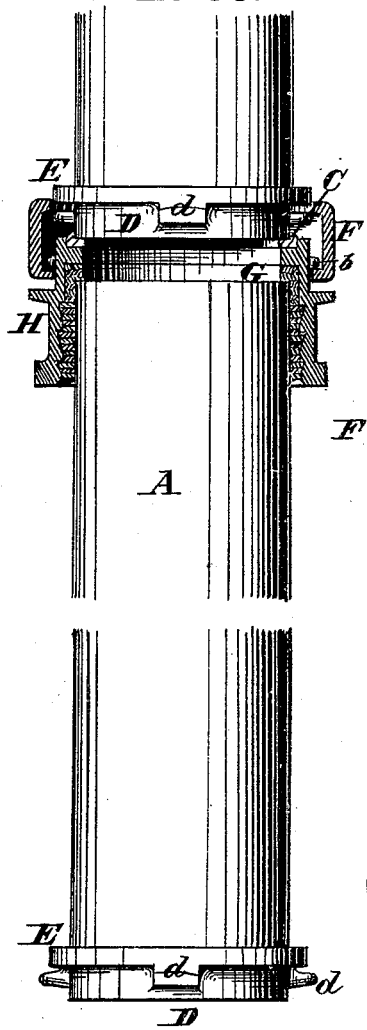
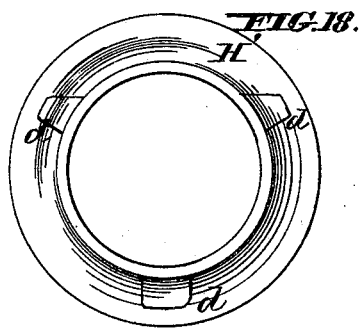
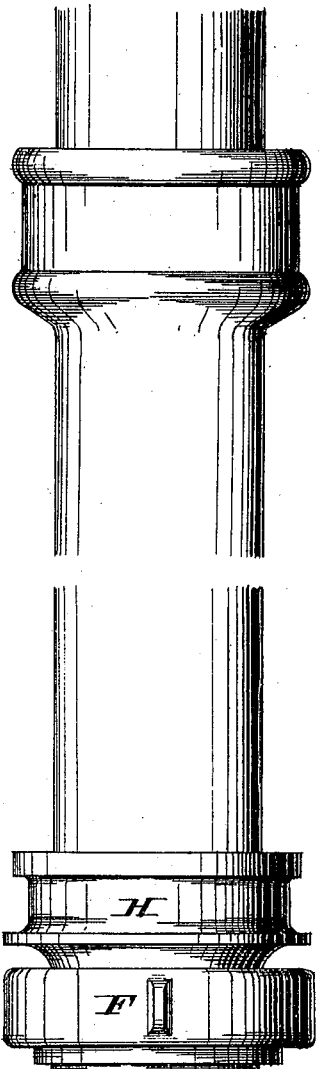
WITNESSES
Chas. J. Gooch,
Walter Allen
INVENTOR
Andrew O'Neill
By Knight Bros, Attorneys 5 Sheets—Sheet 4.
A. O'NEILL.
PIPE JOINTS.
No. 179,815. Patented July 11, 1876.
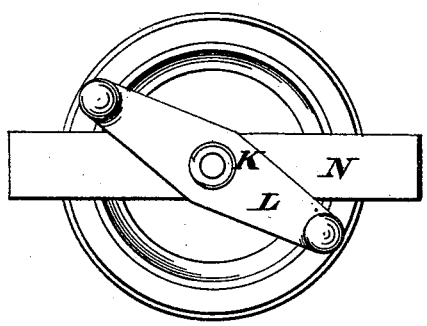
FIG. 20.
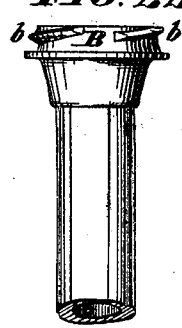
FIG. 22.
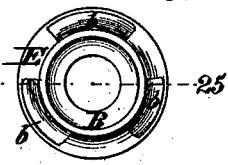
FIG. 23.
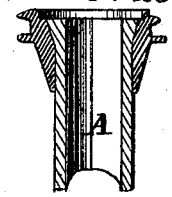
FIG. 25.
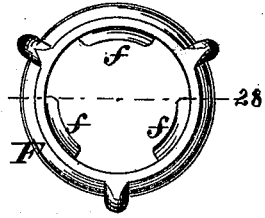
FIG. 27.
FIG. 28.
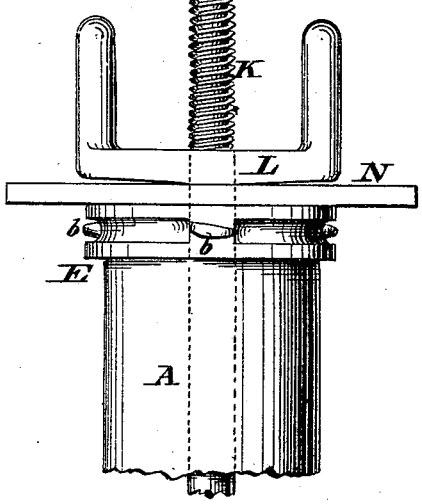
FIG. 21.
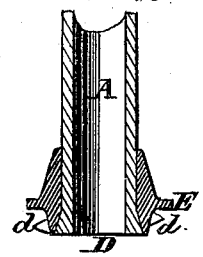
FIG. 26.
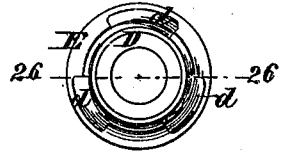
FIG. 24.
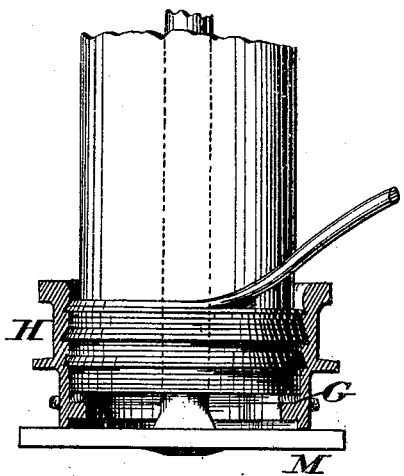
WITNESSES.
Chas. J. Gooch
Walter Allen
INVENTOR
Andrew O'Neill
By Knight Bro. Attorneys
N. PETERS, PHOTO-LITHOGRAPHER, WASHINGTON, D. C.

5 Sheets—Sheet 5.

A. O'NEILL.
PIPE JOINTS.

No. 179,815. Patented July 11, 1876.

WITNESSES
Chas J Gooch
Walter Allen

INVENTOR
Andrew O'Neill
By Knight Bro, Attorneys

UNITED STATES PATENT OFFICE.

ANDREW O'NEILL, OF BALTIMORE, MARYLAND.

IMPROVEMENT IN PIPE-JOINTS.

Specification forming part of Letters Patent No. 179,815, dated July 11, 1876; application filed February 21, 1876.

*To all whom it may concern:*

Be it known that I, ANDREW O'NEILL, of Baltimore, in the State of Maryland, have invented a certain new and useful Improvement in Joints for Soil, Drain, Steam, and other Pipes, of which the following is a specification:

My invention has for its object the formation of joints in soil, drain, heater, and other pipes without the use of hot lead or costly cement, and without lapping the sections.

The invention is specially designed for use in connection with cast-iron pipes, but is not limited in its application thereto.

In carrying out my invention I construct the pipe-sections with lugs or flanges on each end, and with a collar encircling the joint, and provided with flanges or lugs adapted to fit the lugs or flanges on the pipe ends, and draw the ends together by a rotary movement of the said collar.

I construct each section of pipe with a recessed end for the reception of a gasket, and a "spigot" end to fit securely on such gasket, and near each with external lugs or flanges, by means of which the end of one section is held to the gasket on the other by the action of a screw-collar encircling the joint. The pipe-sections are further provided with fixed collars, beads, or flanges to receive pressure from a suitable jack, by which the ends are forcibly pressed together, while the screw-collar is adjusted to hold them.

To adapt my improved couplings for use in connection with a common pipe, or with a short section from which the peculiar recessed or spigot end, as the case may be, has been cut away, I provide detached hubs or coupling ends, adapted to receive and securely pack the cylindrical end of such cut or common pipe, and constructed with either a spigot or recessed end, so as to adapt them to fit either the recessed or spigot end of the next section, as may be required.

Figure 2:
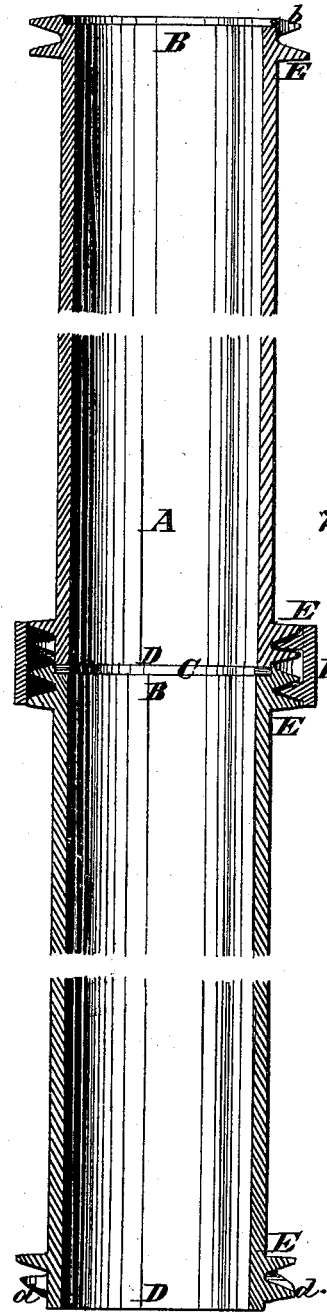
Figure 3:
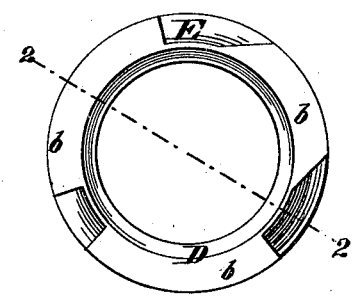
Figure 6:
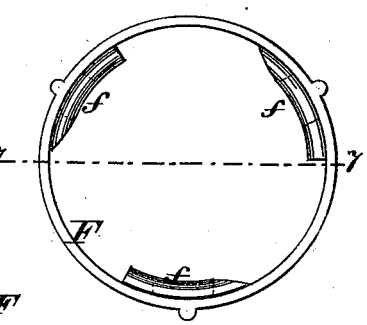
Figure 7:
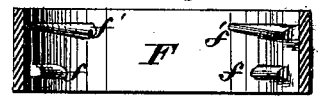
Figure 5:
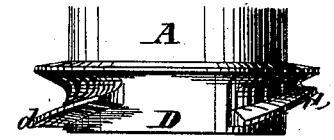
Figure 4:
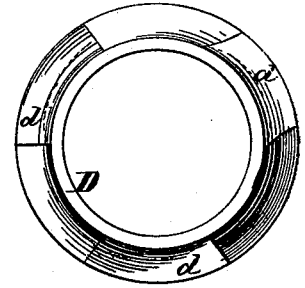
Figure 29:
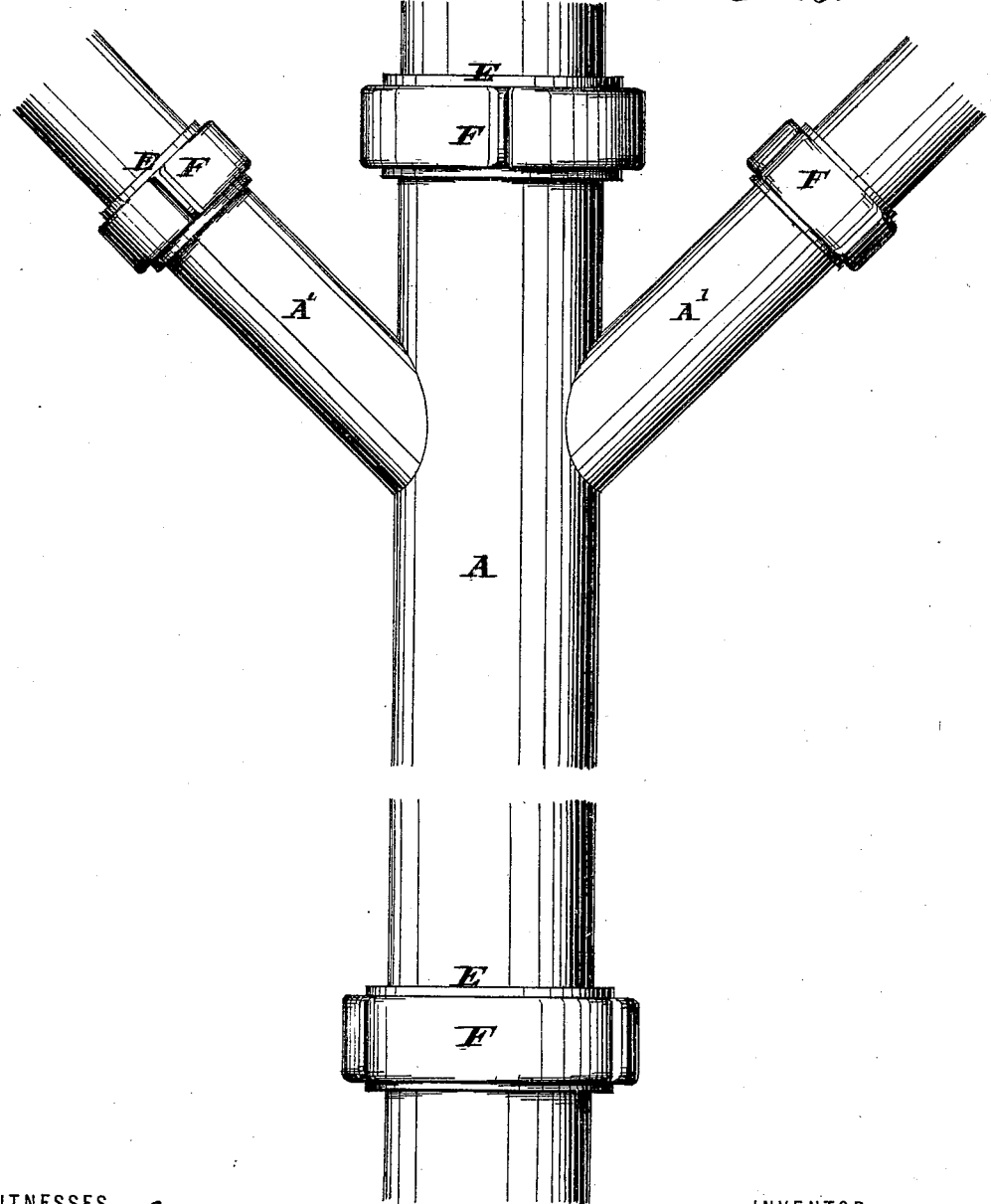

In the accompanying drawing, Figure 1 is a perspective view of two sections of pipe coupled together. Fig. 2 is a section on the line 2 2, Fig. 3. Fig. 3 is a view of the recessed end of the pipe. Fig. 4 is a view of the spigot end. Fig. 5 is a side elevation of the spigot end. Fig. 6 is an end view of the coupling-collar. Fig. 7 is a section on the line 7 7 Fig. 6. Fig. 8 is an elevation illustrating a modification in the construction of the couplings. Fig. 9 is a longitudinal section of the pipe and coupling shown in Fig. 8. Fig. 10 is a transverse section on the line 10 10, Fig. 9. Fig. 11 is a view of the spigot end of the same pipe. Fig. 12 is a transverse section of the coupling on the line 12 12, Fig. 13. Fig. 13 is a longitudinal section of the same on the line 13 13, Fig. 12. Fig. 14 is a section of the gasket. Fig. 15 is a sectional elevation, illustrating the mode of coupling the spigot end of the pipe to a short joint from which the corresponding recessed end has been cut away. Fig. 16 is a sectional elevation, illustrating the mode of coupling the recessed end to a joint from which the corresponding spigot end has been cut away. Fig. 17 is a face view of the recessed hub shown in Fig. 15, for receiving the cut end of a joint and coupling to the spigot end of a complete joint. Fig. 18 is a face view of the spigot-hub for receiving the cut end of a joint and coupling to the recessed end of a complete joint. Fig. 19 is an elevation illustrating the application of the same invention in coupling to a pipe of common construction. Fig. 20 is a plan of a screw-jack employed in applying the hubs shown in Figs. 15 to 19, inclusive. Fig. 21 is an elevation of the same, showing the hub in section. Fig. 22 is an elevation illustrating the application of the invention to the coupling of lead pipes. Fig. 23 is a face view of the recessed end shown in Fig. 22. Fig. 24 is a face view of the spigot end shown in Fig. 22. Fig. 25 is a longitudinal section on the line 25 25, Fig. 23. Fig. 26 is a longitudinal section on the line 26 26, Fig. 24. Fig. 27 is an end view of the coupling. Fig. 28 is a longitudinal section on the line 28 28, Fig. 27. Fig. 29 is an elevation of a double-Y connection.

Each pipe-section A is constructed with a recessed end, B, for the reception of a gasket, C, and with a spigot end, D, to fit upon such a gasket in the recessed end of the next section. E E are fixed beads or collars cast on the pipe-sections at a proper distance from each end to receive a jack or clamp, by which the pipe ends are firmly pressed, one on the other, while the coupling-collar F is turned up to secure them. The coupling-collar F constitutes a sleeve encircling the joint between the pipe ends, and constructed at its ends with internal flanges $f\ f'$, of which those at one end have oblique or spiral faces, to adapt them to operate as a sectional screw. $b\ d$ are external lugs or flanges on the recessed and spigot end, respectively, of the pipe-sections, with which lugs or flanges the internal flanges $f\ f'$ of the coupling-collar F engage, the said flanges $f\ f'$ being notched or recessed to permit the passage of the lugs $b\ d$. In Figs. 2–7 both sets of flanges $f$ and $f'$ are shown inclined or spiral, so as to act as screw threads. In Figs. 9–13 the flanges $f$ are shown inclined, so as to draw against the lugs $b$, while the straight flanges $f'$ hold against the lugs $d$. C represents a gasket fitted within the recessed end B to receive the spigot end D, and form a tight joint in connection therewith. The said gasket is preferably made, as shown in section in Fig. 14, with one concave and one convex face, and with annular feather-edged lips $c$, to adapt it to close the joint with moderate pressure. This gasket may be made of lead or soft rubber or other compressible material; or, if preferred, a flat gasket of paper, hemp, or other fibrous material may be used. The gasket is preferably coated with litharge or other gum-fluid luting. In case it is necessary to connect to a cut or a common pipe, a recessed hub, H, or a spigot-hub, H', is employed, as may be required. The said hubs are each formed with an annular gasket-seat and internal grooves for packing around the pipe with lead rope, and with either a recessed or spigot end similar to those of the pipe-couplings, and adapted for connection thereto.

To apply whichever hub may be required to the cut section which is to be connected, the cut end of said section is inserted in the hub, its end bearing on the gasket G, and is forced thereon by means of a screw-jack, K L M N. The annular space around the pipe is then securely packed by means of lead rope tamped around it.

My improved pipe-joints are connected to wrought-iron, copper, lead, or other pipe, by inserting the end of such pipe in a short tapering section formed with my improved coupling devices, and expanding it therein by means of a mandrel or wedging-plug. This part of the invention is illustrated in Figs. 22 to 26.

The pipe, as it comes from the foundry without any finishing, is furnished to the trade ready to be put together, with a gasket of lead, rubber, paper, or other material adapted to form a tight joint.

The usual commercial length of a soil-pipe is five feet, to which is added three inches for lap.

One economical feature in my invention consists in a peculiar joint, dispensing with any lap, reducing the amount of metal, and avoiding the use of hemp, lead, cement, or any of the costly appliances used in the customary mode of connecting soil, drain, and heater pipes.

My invention avoids all the danger attending the use of fire for melting lead within buildings, and also dispenses with the cost of skilled labor for setting up and jointing soil, heater, or other similar pipes.

The joint applies to tees, crosses, half-tees, single and double Y's, traps, and all fittings usually applied to steam, soil, and drain pipes. It is also particularly well adapted for underground telegraphs, pneumatic tubes, &c., being flush inside.

In the case of cracking of steam-pipes in frosty weather, for steam-pipes, or the stoppage of water-closet pipes by solid matter, it is frequently necessary to remove a section of pipe, which section with the old system of joints must be broken and destroyed.

This difficulty is avoided by my invention, which admits of removing a section at any point without injury, and cleaning and replacing it with a new section, as may be required.

The application of the invention to a double-Y connection is shown at A' in Fig. 29.

Having thus described my invention, the following is what I claim as new therein, and desire to secure by Letters Patent:

1. The pipe ends formed with lugs or flanges, in combination with the collar, provided with corresponding flanges or lugs, for drawing the two ends of the pipe together, substantially as set forth.

2. The pipe end formed with lugs or flanges for the reception of the collar, and with a bead behind said lugs or flanges, to receive a jack for pressing the pipe ends together, as explained.

3. The combination of the recessed pipe end, the spigot end, and a suitable gasket, C, pressed between them, in the manner explained.

4. The jack K L M N, constructed and employed for pressing coupling-lugs on the ends of cut or common pipes, in manner substantially as set forth.

ANDREW O'NEILL.

Witnesses:
OCTAVIUS KNIGHT,
CHAS. J. GOOCH.